(12) United States Patent
Katragadda et al.

(10) Patent No.: US 8,521,761 B2
(45) Date of Patent: Aug. 27, 2013

(54) TRANSLITERATION FOR QUERY EXPANSION

(75) Inventors: Lalitesh Katragadda, Hyderabad (IN); Vineet Gupta, Bangalore (IN); Piyush Prahladka, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1016 days.

(21) Appl. No.: 12/503,806

(22) Filed: Jul. 15, 2009

(65) Prior Publication Data

US 2010/0017382 A1      Jan. 21, 2010

Related U.S. Application Data

(60) Provisional application No. 61/082,165, filed on Jul. 18, 2008.

(51) Int. Cl.
*G06F 7/00*      (2006.01)
*G06F 17/30*    (2006.01)

(52) U.S. Cl.
USPC ..................................................... 707/760

(58) Field of Classification Search
USPC ..................................................... 707/760
See application file for complete search history.

(56) References Cited

U.S. PATENT DOCUMENTS

| | | |
|---|---|---|
| 5,774,834 A | 6/1998 | Visser |
| 5,787,452 A | 7/1998 | McKenna |
| 7,031,911 B2 | 4/2006 | Zhou et al. |
| 2003/0097252 A1 | 5/2003 | Mackie |
| 2005/0216253 A1 | 9/2005 | Brockett |
| 2006/0112091 A1* | 5/2006 | Chapman et al. ............... 707/4 |
| 2007/0011154 A1* | 1/2007 | Musgrove et al. .............. 707/5 |
| 2007/0288448 A1* | 12/2007 | Datta ................................. 707/5 |

OTHER PUBLICATIONS

International Search Report and Written Opinion from International Application No. PCT/US 08/56087; mailed Aug. 4, 2008; 13 pages.

* cited by examiner

*Primary Examiner* — Khanh Pham
*Assistant Examiner* — Van Oberly
(74) *Attorney, Agent, or Firm* — Middleton Reutlinger

(57) ABSTRACT

Methods, systems, and apparatus, including computer program products, for identifying candidate synonyms of transliterated terms for query expansion. In one aspect, a method includes identifying multiple transliterated terms in a target language. For each transliterated term of the multiple transliterated terms in the target language, the transliterated term is mapped to one or more terms in a source language. For a first transliterated term of the multiple transliterated terms in the target language, one or more second transliterated terms of the multiple transliterated terms in the target language are identified as candidate synonyms of the first transliterated term, where each of the one or more second transliterated terms is mapped to at least one term in the source language that is also mapped from the first transliterated term.

17 Claims, 7 Drawing Sheets

Transliteration of Hindi word
(in English)

210 {
- sreeram
- sriram
- shriram
- shreeram
- sriraam

FIG. 2A

TRANSLITERATION FOR QUERY EXPANSION

CROSS-REFERENCE TO RELATED APPLICATION

This application claims the benefit under 35 U.S.C. §119(e) of U.S. Patent Application No. 61/082,165, filed Jul. 18, 2008, which is incorporated by reference herein in its entirety.

BACKGROUND

This specification relates to query expansion for users submitting queries to search engines.

Search engines—and, in particular, Internet search engines—aim to identify resources (e.g., web pages, images, text documents, multimedia context) that are relevant to a user's needs and to present information about the resources in a manner that is most useful to the user. Internet search engines return search results in response to a user submitted query. If a user is dissatisfied with the search results returned for a query, the user can attempt to refine the query to better match the user's needs.

Some search engines provide a user with suggested alternative queries, for example, expanded queries, that the search engine identifies as being related to the user's query. Techniques for finding synonyms of query words for query expansion typically depend on natural language models or user search log data. The identified synonyms of query words can be used to expand a query in an attempt to identify additional or more relevant resources to improve user search experience.

Electronic documents are typically written in many different languages. Each language is normally expressed in a particular writing system (i.e., a script), which is usually characterized by a particular alphabet. For example, the English language is expressed using the Latin alphabet while the Hindi language is normally expressed using the Devanāgarī alphabet. The scripts used by some languages include a particular alphabet that has been extended to include additional marks or characters. In transliteration, the script of one language is used to represent words normally written in the script of another language. For example, a transliterated term can be a term that has been converted from one script to another script or a phonetic representation in one script of a term in another script. Techniques for finding synonyms of query words for query expansion may not work well for finding synonyms of query terms that are transliterated terms. For example, current natural language techniques do not work well with transliterated data, and search log data typically provide poor coverage for most transliterated variations.

SUMMARY

This specification describes technologies relating to identifying candidate synonyms of transliterated terms for query expansion.

In general, one aspect of the subject matter described in this specification can be embodied in computer-implemented methods that include the actions of identifying, using one or more computers, multiple transliterated terms in a target language, for each transliterated term of the multiple transliterated terms in the target language, mapping the transliterated term to one or more terms in a source language, and for a first transliterated term of the multiple transliterated terms in the target language, identifying one or more second transliterated terms of the multiple transliterated terms in the target language as candidate synonyms of the first transliterated term, where each of the one or more second transliterated terms is mapped to at least one term in the source language that is also mapped from the first transliterated term. Other embodiments of this aspect include corresponding systems, apparatus, and computer program products.

These and other embodiments can optionally include one or more of the following features. Identifying the multiple transliterated terms in the target language can further include identifying from web resources terms containing only characters of the target language. The aspect can further include computing a statistic for each identified term containing only characters of the target language, comparing the statistic for each identified term to a specified threshold, and including a particular identified term in the multiple transliterated terms in the target language if the statistic for the particular identified term exceeds the specified threshold.

The statistic for each identified term can be a ratio of a probability of occurrence of the identified term in web resources of a top-level domain associated with one or more locales where the source language is spoken to a probability of occurrence of the identified term in web resources of a top-level domain associated with any locale. The statistic for each identified term can be a ratio of a probability of occurrence of the identified term in web resources associated with one or more locales where the source language is spoken to a probability of occurrence of the identified term in web resources associated with any locale. The association of a web resource with a locale where the source language is spoken can be determined by a top-level domain of the web resource.

Mapping the transliterated term to one or more terms in the source language can further include transliterating the transliterated term in the target language to the one or more terms in the source language. Each of the one or more second transliterated terms identified as candidate synonyms of the first transliterated term can have a confidence value with respect to the first transliterated term that is above a specified threshold. The confidence value of a second transliterated term can be a function of a number of terms in the source language that are mapped from both the first transliterated term and the second transliterated term. Transliterating the transliterated term in the target language to a term in the source language can further include generating a transliteration score for the transliteration of the transliterated term in the target language to the term in the source language. The confidence value of a second transliterated term can be a function of one or more of a probability of occurrence of the second transliterated term in web resources, the transliteration score for the transliteration of the second transliterated term to a term in the source language that is also mapped from the first transliterated term, and the transliteration score for the transliteration of the first transliterated term to the term in the source language.

The aspect can further include, for the first transliterated term of the multiple transliterated terms in the target language, identifying one or more terms in the source language that are mapped from the first transliterated term and from at least one of the one or more second transliterated terms as candidate synonyms of the first transliterated term. The aspect can further include receiving a query including the first transliterated term, expanding the query with one or more of the candidate synonyms of the first transliterated term, providing the expanded query to a search engine, and receiving search results for the expanded query. The aspect can further include receiving a query including the first transliterated term, and providing one or more expanded queries for selection by a user, each expanded query including the query and one or more of the candidate synonyms of the first transliterated term.

The aspect can further include receiving a query including the first transliterated term, providing the query to a search engine, where the search engine identifies as a possible search result for the query a web resource that includes at least one of the candidate synonyms of the first transliterated term but does not include any term in the query, and modifying a score associated with the web resource, the score for use in ranking possible search results for the query. The aspect can further include receiving a query including the first transliterated term, providing the query to a search engine, where the search engine identifies as a possible search result for the query a web resource that includes at least one of the terms in the source language that is mapped from the first transliterated term and from at least one of the one or more second transliterated terms but does not include any term in the query, and modifying an information retrieval score associated with the web resource, the information retrieval score for use in ranking possible search results for the query.

Another aspect of the subject matter described in this specification can be embodied in computer-implemented methods that include the actions of generating, using one or more computers, a training group of possible transliterated synonyms in a target language, training a probabilistic model using the training group to learn probabilities of spelling variations in transliterated synonyms in the target language, and applying the probabilistic model to a particular transliterated term in the target language to identify one or more candidate synonyms of the particular transliterated term. Other embodiments of this aspect include corresponding systems, apparatus, and computer program products.

Another aspect of the subject matter described in this specification can be embodied in computer-implemented methods that include the actions of identifying, using one or more computers, multiple transliterated terms in a target language, for a first transliterated term of the multiple transliterated terms in the target language, identifying one or more second transliterated terms of the multiple transliterated terms in the target language as candidate synonyms of the first transliterated term, and using the candidate synonyms of the first transliterated term to expand queries including the first transliterated term. Other embodiments of this aspect include corresponding systems, apparatus, and computer program products.

Particular embodiments of the subject matter described in this specification can be implemented to realize one or more of the following advantages. Transliterated terms are identified as candidate synonyms for a particular transliterated term, where the candidate synonyms can be used for expanding queries including the particular transliterated term. Transliterated synonyms in a target language can be identified for newer transliterated terms (e.g., terms transliterated from terms in a source language from current news stories or current cultural references), which may have poor coverage in user search log data. A system that can expand a user's query to include candidate transliterated synonyms for a given transliterated term may return better search results than a search system that does not have the same query expansion capability.

The details of one or more embodiments of the subject matter described in this specification are set forth in the accompanying drawings and the description below. Other features, objects, and advantages of the subject matter will be apparent from the description, the drawings, and the claims.

BRIEF DESCRIPTION OF DRAWINGS

FIGS. 2A-2C illustrate an example technique for identifying candidate synonyms for a transliterated term.

Like reference symbols and designations in the various drawings indicate like elements.

DETAILED DESCRIPTION

Figure 1:
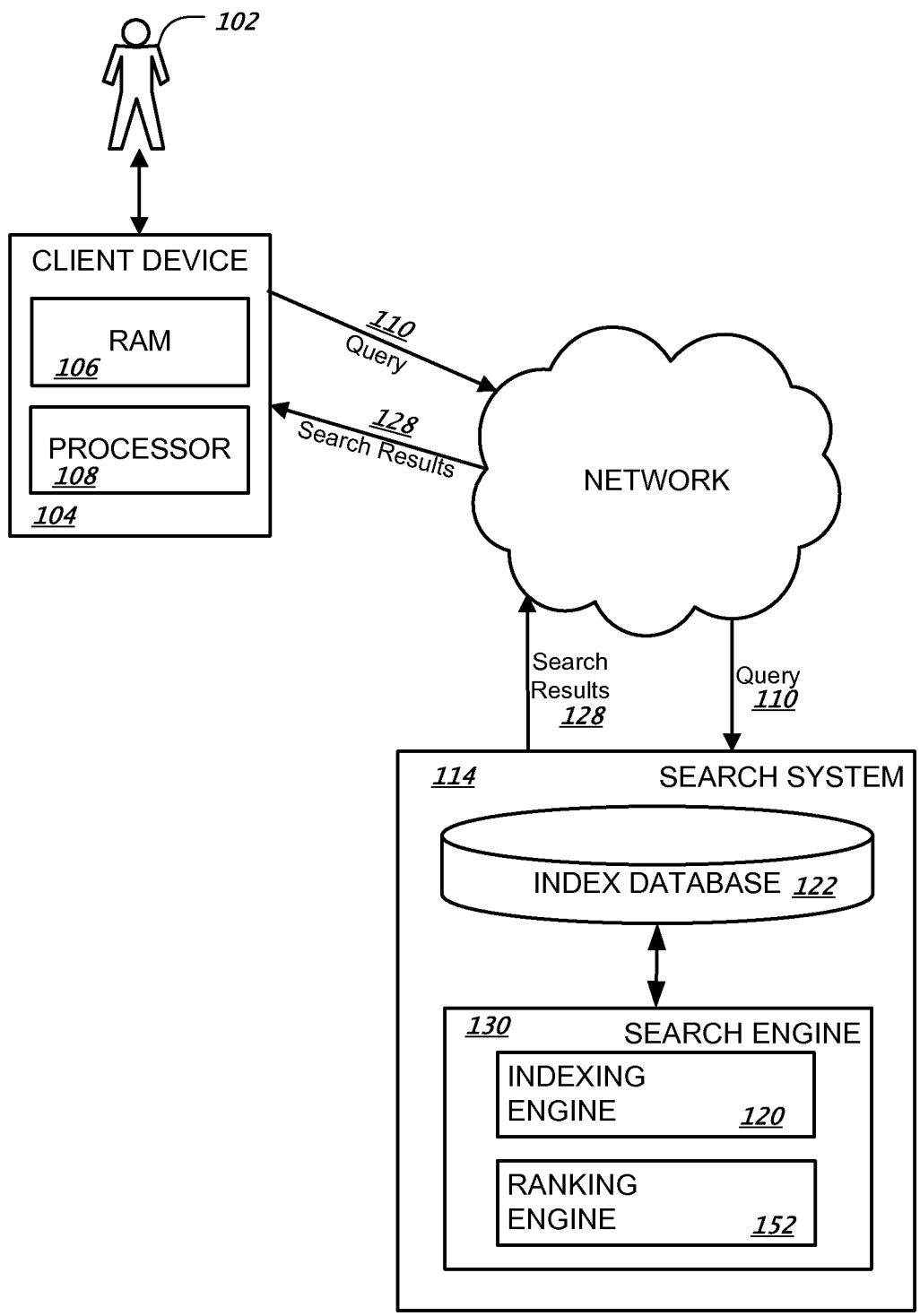
FIG. 1 is a block diagram of an example search system.

FIG. 1 is a block diagram of an example search system 114 that can be used to provide search results relevant to submitted queries as can be implemented in an Internet, an intranet, or another client and server environment. The search system 114 is an example of an information retrieval system in which the systems, components, and techniques described below can be implemented.

A user 102 can interact with the search system 114 through a client device 104. For example, the client 104 can be a computer coupled to the search system 114 through a local area network (LAN) or wide area network (WAN), e.g., the Internet. In some implementations, the search system 114 and the client device 104 can be one machine. For example, a user can install a desktop search application on the client device 104. The client device 104 will generally include a random access memory (RAM) 106 and a processor 108.

A user 102 can submit a query 110 to a search engine 130 within a search system 114. When the user 102 submits a query 110, the query 110 is transmitted through a network to the search system 114. The search system 114 can be implemented as, for example, computer programs running on one or more computers in one or more locations that are coupled to each other through a network. The search system 114 includes an index database 122 and a search engine 130. The search system 114 responds to the query 110 by generating search results 128, which are transmitted through the network to the client device 104 in a form that can be presented to the user 102 (e.g., as a search results web page to be displayed in a web browser running on the client device 104).

When the query 110 is received by the search engine 130, the search engine 130 identifies resources that match the query 110. The search engine 130 will generally include an indexing engine 120 that indexes resources (e.g., web pages, images, or news articles on the Internet), an index database 122 that stores the index information, and a ranking engine 152 (or other software) that ranks the resources that match the query 110. The search engine 130 can transmit the search results 128 through the network to the client device 104 for presentation to the user 102.

In some scenarios, a query includes one or more terms that are transliterated terms. Transliteration converts a term in a source language to a transliterated term in a target language. After conversion, the letters or characters of the term in the source language are represented by letters or characters of the target language. A machine learning technique for transliteration is described, for example, in U.S. patent application Ser. No. 12/043,854, titled "Machine Learning for Transliteration," filed Mar. 6, 2008.

Terms transliterated from one language to another language can be used in Internet resources. For example, Indic languages like Hindi, Tamil, Telugu, Kannada, and Malayalam are sometimes transliterated to English on Internet resources (e.g., Indian blogs or electronic Indian technical textbooks). These languages, along with some non-Indic languages (e.g., Chinese and other logographic writing systems) often do not have well-developed alternate input mechanisms, such that it is cumbersome to enter characters in these languages.

Transliterations do not have a notion of correct spelling. As a result, there often exist multiple spellings in a target language for transliterations of a word in a source language. For a particular term in a source language having multiple transliterations in a target language, transliterated terms in the target language that vary from a given transliterated term in the target language can be treated as candidate synonyms of the given transliterated term. These candidate transliterated synonyms are different possible transliterations of the same term in the source language.

As an example, the Hindi word, , can be transliterated into English as "chakrabarti" or "chakrabarty". Thus, the transliterated term "chakrabarty" can be identified as a candidate synonym of the given transliterated term, "chakrabarti".

Candidate synonyms identified for a given transliterated term can be used to expand queries that include the given transliterated term. For example, if there is a popular new Hindi song available on several websites on the Internet, a user may find it difficult to search for the song if the websites transliterate a Hindi word in the song title to a first transliterated term while the user enters a query with a second transliterated term for the same Hindi word. A search system that can expand the user's query to include candidate transliterated synonyms for the second transliterated term may return better search results than a search system that does not have the same query expansion capability.

Figure 2B:
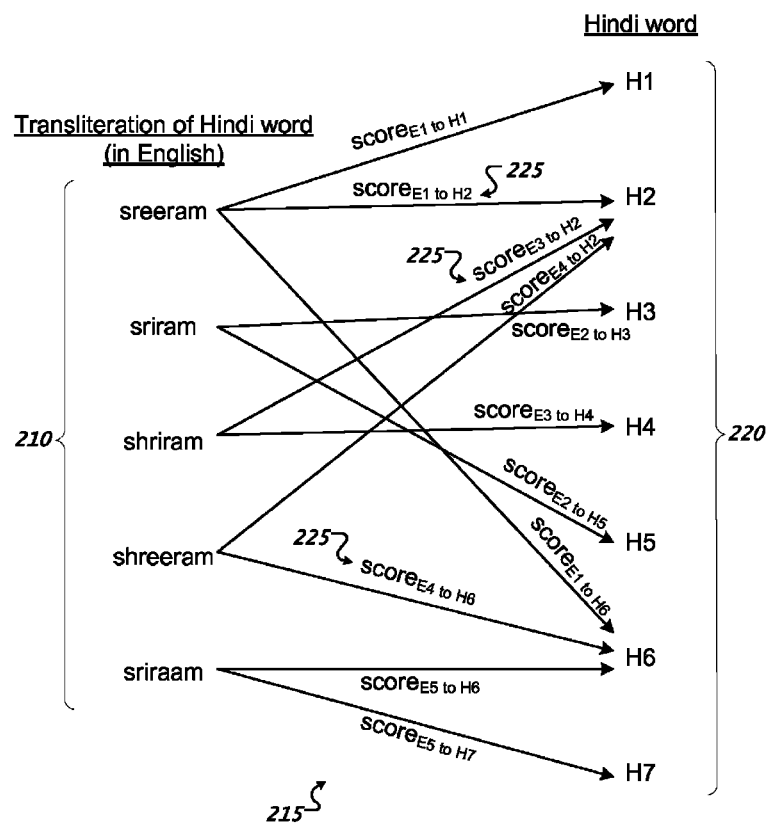
Figure 2C:
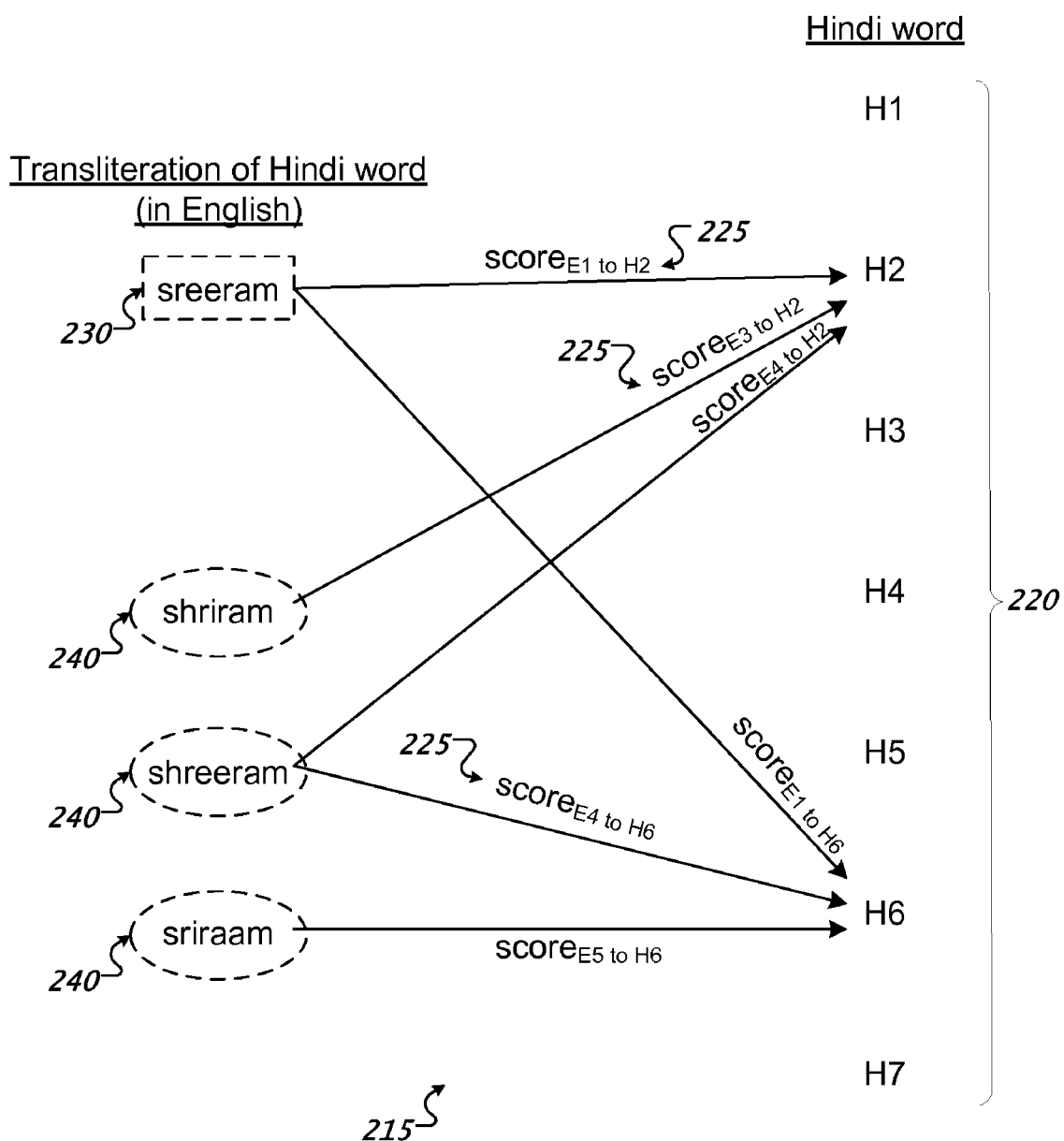

FIGS. 2A-2C illustrate an example technique for identifying candidate synonyms for a transliterated term. For convenience, the example technique will be described with reference to a system that performs the technique. The example technique can be used to expand a query including the transliterated term to include synonyms of the transliterated term in an attempt to improve the search results returned for the query. The example technique uses transliteration techniques to determine what terms in a target language (e.g., English) are transliterated from the same term in a source language (e.g., Hindi). Several techniques can be implemented to increase the precision or quality of the candidate synonyms.

FIG. 2A illustrates a list 210 of possible transliterated terms in English, the target language, where the source language is Hindi. A system can generate or identify the list 210 of possible transliterated terms in any number of different ways.

For example, the system can identify the possible transliterated terms of the list 210 from web resources as terms containing only characters of the target language (e.g., Latin characters). The identified terms containing only characters of the target language include words with meaning in the target language and possible transliterated terms without meaning in the target language.

To separate the possible transliterated terms from non-transliterated terms (e.g., the words with meaning), the system can compute statistics for the identified terms containing only characters of the target language and can compare the statistics to a specified threshold. That is, for each identified term, a statistic is computed and compared to a threshold, where the system includes the identified term in the list 210 of possible transliterated terms if the statistic for the identified term exceeds the specified threshold.

In one example where English is the target language and Hindi is the source language, transliterated terms in English may have a higher probability of occurring on an Indian web resource than on non-Indian web resources. In this example, the statistic for each identified term containing only Latin characters can be a function of the probability of occurrence on an Indian web resource.

In some implementations, the statistic for each identified term is a ratio of the probability of occurrence of the identified term in web resources of a top-level domain associated with one or more locales (e.g., countries or regions) where the source language is spoken to the probability of occurrence of the identified term in web resources of a top-level domain associated with any locale. For example, the statistic could be the ratio of the probability of the identified term occurring on an Indian web page to the probability of the identified term occurring on any web page. If the statistic computed for a particular identified term exceeds a specified threshold, the particular identified term can be included in the list 210 of possible transliterated terms.

In some other implementations, the statistic for each identified term is a ratio of the probability of occurrence of the identified term in web resources associated with one or more locales (e.g., countries or regions) where the source language is spoken to the probability of occurrence of the identified term in web resources associated with any locale. The association of a web resource with a locale where the source language is spoken can be determined by a top-level domain of the web resource. For example, the statistic could be the ratio of the probability of the identified term occurring on an Indian web domain to the probability of the identified term occurring on any web domain. If the statistic computed for a particular identified term exceeds a specified threshold, the particular identified term can be included in the list 210 of possible transliterated terms.

In some scenarios, a particular web page or a particular web domain may use a particular identified term an exceptionally large number of times, which could skew the statistic for the particular identified term. In some implementations, the system caps the statistic for each identified term or a component of the statistic for each identified term at a specified limit to prevent skewing of the statistic. For example, the system can cap the per-page contribution of the identified term on Indian web pages or the per-domain contribution of the identified term on Indian domains.

In some implementations, the statistic for each identified term is a ratio of the probability of the identified term being included in a query submitted to a search engine having an interface in the source language to the probability of the identified term being included in a query submitted to a search engine having an interface in any language. For the example, the system can compute the statistic using Indian and non-Indian search logs.

In some implementations, to separate the possible transliterated terms from the non-transliterated terms (e.g., words with meaning in the target language), the system computes multiple statistics for each identified term containing only characters of the target language and compares the multiple statistics to respective thresholds. If the multiple statistics for a particular identified term each exceed a respective threshold, the system can include the particular identified term in the list 210 of possible transliterated terms.

The possible transliterated terms of the list 210 can alternatively be identified by crawling only known web resources associated with the source language. For the example where the source language is Hindi, the system can identify the possible transliterated terms by crawling known Indian websites, for example, Indian blog sites or websites that translate Hindi songs or Hindi technical textbooks.

FIG. 2B illustrates relations 215 between each possible transliterated term of the list 210 and one or more terms 220 in the source language, Hindi. Each relation 215 is the result of mapping an element of a first group (i.e., the possible transliterated terms in the target language) to one or more elements of a second group (i.e., the terms 220 in the source language). That is, mapping forms a one-way relation between a possible transliterated term in the target language and one or more terms 220 in the source language. In the example technique of FIG. 2B, the relations 215 are the result of mapping by transliteration performed, for example, by an English-to-Hindi machine transliterator, implemented as an element of a system.

In some implementations, mapping includes generating a transliteration score 225 for each transliteration from a possible transliterated term in the target language to a term 220 in the source language. For example, FIG. 2B illustrates the transliteration score 225 for each transliteration, including the score from "sreeram" to H2 (e.g., $score_{E1\ to\ H2}$), the score from "shriram" to H2 (e.g., $score_{E3\ to\ H2}$), and the score from "shreeram" to H6 (e.g., $score_{E4\ to\ H6}$).

If transliteration scores 225 are generated by mapping, the transliteration score 225 of a given possible transliterated term of the list 210 can be a component of a confidence value of the given possible transliterated term with respect to another possible transliterated term. The system can use these confidence values in identifying the possible transliterated terms that should be considered as candidate synonyms for a particular transliterated term. The transliteration scores 225 and the confidence values are described in more detail with respect to FIG. 2C.

FIG. 2C illustrates identifying, for a first possible transliterated term 230, one or more second possible transliterated terms 240 as candidate synonyms of the first possible transliterated term 230.

If the transliterator maps a term 220 in the source language from two or more possible transliterated terms in the target language, this suggests a synonym relationship between the two or more possible transliterated terms in the target language. For example, H2 is a Hindi word in the source language that is mapped by the transliterator from three possible transliterated terms: "sreeram", "shriram", and "shreeram", suggesting that the three transliterated terms are synonyms.

In the example technique of FIG. 2C, the system identifies the second possible transliterated terms 240 as candidate synonyms of the first possible transliterated term 230 by identifying the possible transliterated terms of the list 210 that are mapped to at least one term 220 in the source language that is also mapped from the first possible transliterated term 230. Intersections of the terms 220 in the source language give candidate groups for transliterated synonyms. Several techniques can be implemented to increase the reliability of the candidate groups for transliterated synonyms.

In some implementations, each of the possible transliterated terms of the list 210 other than the first possible transliterated term 230 has a confidence value with respect to the first possible transliterated term 230. In these implementations, if a particular possible transliterated term has a confidence value with respect to the first possible transliterated term 230 that is above a specified threshold, the particular possible transliterated term is a second possible transliterated term 240 identified as a candidate synonym of the first possible transliterated term 230. If mapping does not produce a transliteration score 225 for each transliteration, the confidence value for a given second possible transliterated term 240 can be a function of the number of terms 220 in the source language that are mapped from both the first possible transliterated term 230 and the given second possible transliterated term 240.

For example, "shriram" and "sriraam" each map to only one term 220 (i.e., H2 and H6, respectively) that is also mapped from "sreeram", the first possible transliterated term 230. The transliterated term "shreeram" maps to two terms 220 (i.e., H2 and H6) that are also mapped from "sreeram", the first possible transliterated term 230. The overlap with "sreeram" of mapped terms 220 in the source language is greater for "shreeram" than for "shriram" and "sriraam", suggesting that "shreeram" might be a more reliable candidate synonym for "sreeram" than either "shriram" or "sriraam". This increased reliability can be reflected in a higher confidence value for "shreeram" with respect to "sreeram".

If mapping produces a transliteration score 225 for each transliteration, the confidence value for a given second possible transliterated term 240 can be a function of the transliteration scores 225 of the first possible transliterated term 230 and of the given second possible transliterated term 240. For example, the confidence value for "shriram", a second possible transliterated term 240, with respect to "sreeram", the first possible transliterated term 230, where both transliterated terms map to H2, can be a function of the transliteration scores 225 $score_{E1\ to\ H2}$ and $score_{E3\ to\ H2}$.

In some implementations, the confidence value for a given second possible transliterated term 240 is a function of a probability of occurrence of the given second possible transliterated term 240 in web resources. For example, the probability of occurrence can be the per-page contribution in web resources or the per-domain contribution in web resources of the given second possible transliterated term 240. Generally, a higher probability of occurrence suggests that the given second possible transliterated term 240 is a more common form of the transliteration from the term in the source language. A higher probability suggests higher confidence in the common transliterated term, which can be reflected in a higher confidence value for the transliterated term.

In some implementations, the confidence value for a given second possible transliterated term 240 is a function of multiple components, e.g., the transliteration scores 225 and a probability of occurrence. Although FIG. 2C includes as second possible transliterated terms 240 all possible transliterated terms that map to a term 220 in the source language that are also mapped from the first possible transliterated term 230, implementation of any of the above techniques for increasing the reliability of candidate groups can reduce the group of candidate synonyms to a subgroup of the second possible transliterated terms 240 illustrated in FIG. 2C.

In some implementations, the system identifies one or more of the terms 220 in the source language that are mapped from the first possible transliterated term 230 and from at least one of the second possible transliterated terms 240 as candidate synonyms of the first possible transliterated term 230 in addition to or instead of the second possible transliterated terms 240. For example, for the first possible transliterated term 230, "sreeram", the system can identify the terms H2 and H6 as candidate synonyms of "sreeram". In some implementations, the system identifies the terms 220 in the source language that are mapped from the same transliterated term in the target language as a candidate synonym group. For the example of FIG. 2C, the system can identify the terms H2 and H6, mapped from the same transliterated terms "sreeram" and "shreeram", as a candidate synonym group.

The system can use the candidate transliterated synonyms (i.e., the second possible transliterated terms 240) for query expansion. For example, when a search system (e.g., the search system 114 of FIG. 1) receives a query including the first possible transliterated term 230, the search system can identify one or more candidate transliterated synonyms of the first possible transliterated term 230. The query can be expanded with one or more of the identified candidate transliterated synonyms of the first possible transliterated term 230. In the example of FIG. 2C, the system can expand a query including "sreeram" to include one or more of "shriram", "shreeram", and "sriraam". In some implementations, the system ranks the candidate synonyms by confidence value, and the system selects only N candidate synonyms with the N highest confidence values for including in expanded queries. The system provides the expanded query to a search engine (e.g., the search engine 130 of FIG. 1), and receives search results for the expanded query.

In some implementations, if the system selects a possible transliterated term as a candidate transliterated synonym for a given transliterated term, the system also selects the given transliterated term as a candidate transliterated synonym for the possible transliterated term. In other implementations, if the system selects a possible transliterated term as a candidate transliterated synonym for a given transliterated term, the system does not select the given transliterated term as a candidate transliterated synonym for the possible transliterated term. That is, there may or may not be reverse mapping of transliterated synonyms. For example, if a first transliterated term "a" is rarely used and a second transliterated term "b" is often used, query expansion of "a" with "b" generally makes sense, because the expansion will result in more search results returned. However, automatically expanding queries of "b" with "a" may not make sense, because the expansion may return irrelevant search results.

In some implementations, instead of expanding a query with one or more candidate transliterated synonyms, mapping candidate transliterated synonyms to a given transliterated term occurs on the document side of a query search. For the above example, if a user submits a query including the transliterated term "b" but not the transliterated term "a" and if a web document contains "a" but not "b," the search system (e.g., the search system 114 of FIG. 1) can treat the web document as if the web document also contains "b," so that the web document is a candidate search result for the search including "b." However, since the web document does not actually include "b," the search system can reduce a score associated with the web document (e.g., an information retrieval score for ranking the web document as a candidate search result), which, consequently, can reduce the chance of the web document being returned for the search.

In some implementations, document-level mapping of candidate synonyms includes one or more terms 220 in the source language. For the example of FIG. 2C, the search system can treat a web document containing "sreeram" as if the web document also contains the Hindi word H2 or H6. The search system can also reduce a score associated with the web document accordingly.

Figure 3:
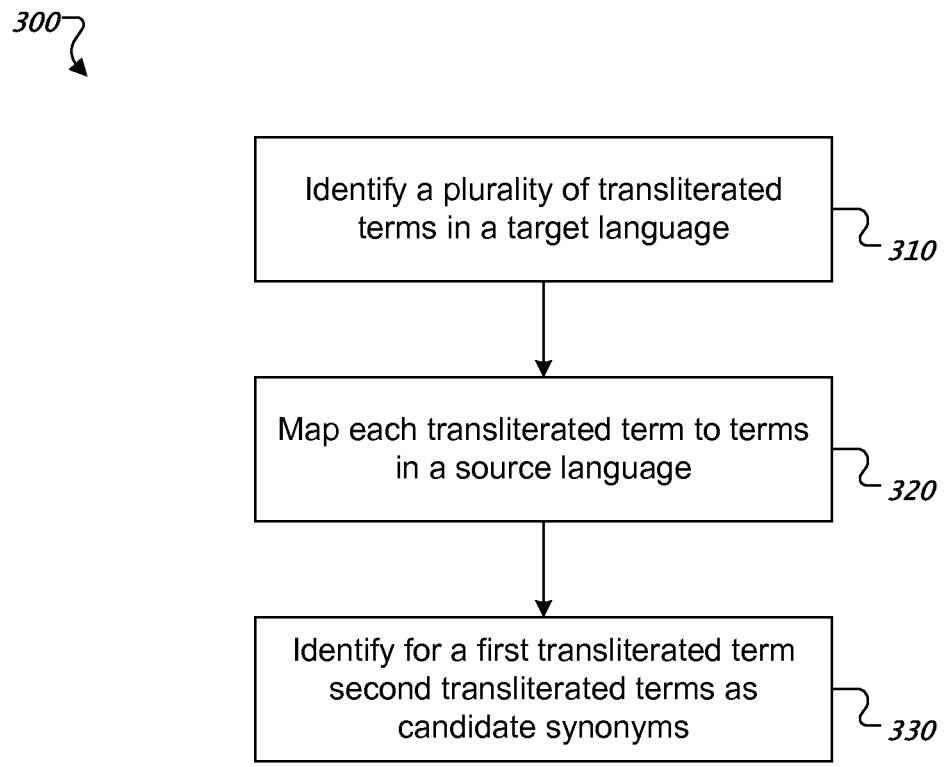
FIG. 3 is a flow chart of an example process for identifying candidate synonyms for a transliterated term.

FIG. 3 is a flow chart of an example process 300 for identifying candidate synonyms for a transliterated term. For convenience, the example process 300 will be described with reference to the example technique of FIGS. 2A-2C and a system that performs the process 300.

The system identifies multiple transliterated terms in a target language (step 310). For example, the system identifies the possible transliterated terms of the list 210 in FIG. 2A.

For each transliterated term of the multiple transliterated terms in the target language, the system maps the transliterated term to one or more terms in a source language (step 320). FIG. 2B illustrates an example of mapping using an English-to-Hindi transliterator.

For a first transliterated term of the multiple transliterated terms in the target language, the system identifies one or more second transliterated terms of the multiple transliterated terms as candidate synonyms of the first transliterated term (step 330). Each of the one or more second transliterated terms is mapped to at least one term in the source language that is also mapped from the first transliterated term. For example, FIG. 2C illustrates second possible transliterated terms 240 (i.e., "shriram", "shreeram", and "sriraam") identified as candidate synonyms of a first possible transliterated term 230 (i.e., "sreeram"). The candidate synonyms can be used for query expansion, for example, as described with respect to FIG. 4.

Figure 4:
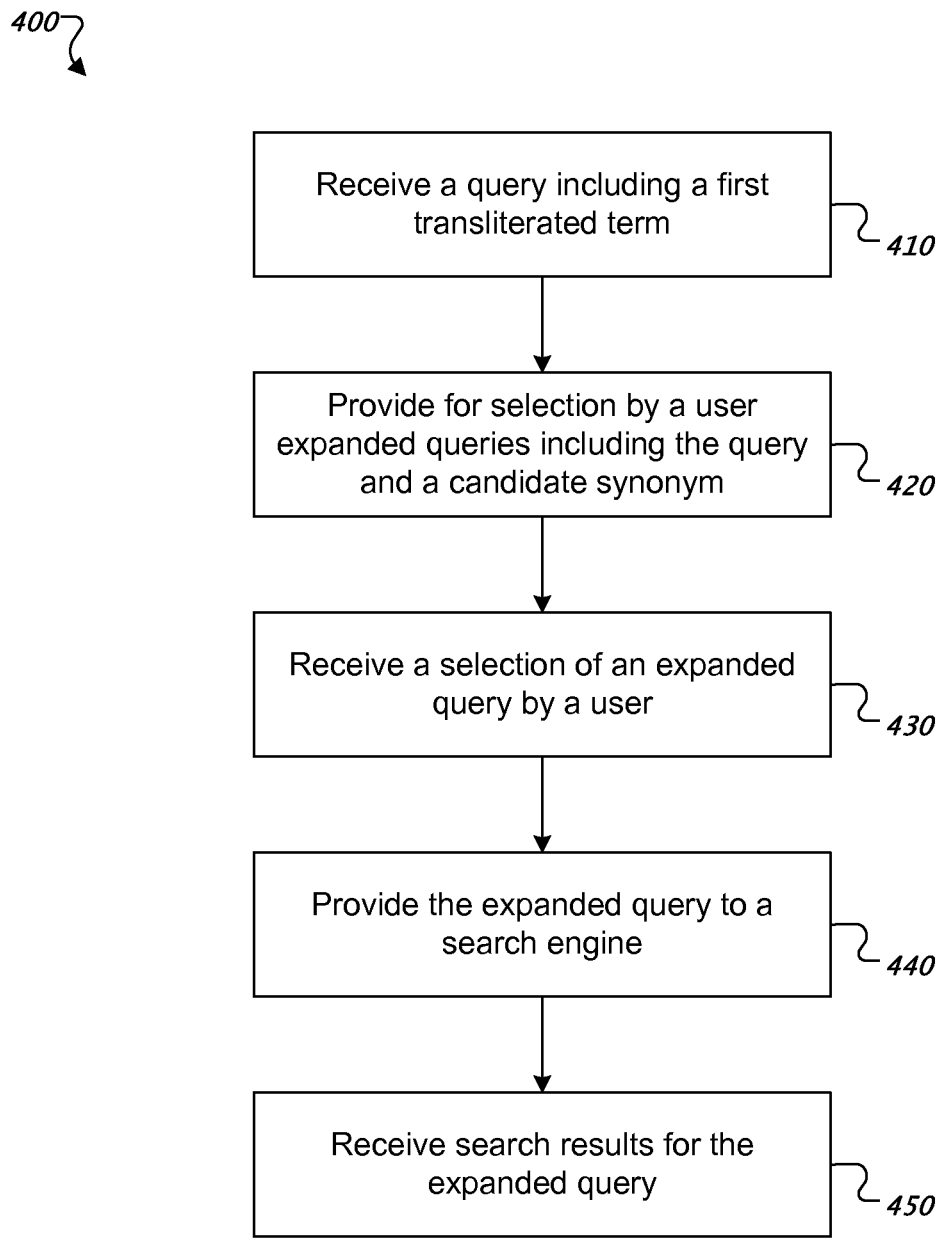
FIG. 4 is a flow chart of an example process for providing search results for an expanded query that includes a transliterated term and a candidate synonym.

FIG. 4 is a flow chart of an example process 400 for providing search results for an expanded query that includes a transliterated term and a candidate synonym. For convenience, the example process 400 will be described with reference to the example technique of FIG. 2A-2C and a system that performs the process 400.

The system receives a query including a first transliterated term (step 410). For example, the query can include the transliterated term "sreeram" illustrated in FIG. 2C.

The system provides one or more expanded queries for selection by a user, where each expanded query includes the query and one or more candidate synonyms of the first transliterated term (step 420). The candidate synonyms can be identified, for example, using the example process 300 of FIG. 3. For a query including the transliterated term "sreeram", the system can provide expanded queries that also include one or more of "shriram", "shreeram", and "sriraam", as illustrated in FIG. 2C.

The system receives a selection of an expanded query from the user (step 430). For example, the expanded queries can be presented to the user as selectable hyperlinks on an interface of a web browser running on a client device (e.g., the client device 104 of FIG. 1). The system can receive the selection of an expanded query as a selection by the user of the hyperlink for the selected expanded query. In some implementations, the system generates an expanded query with one or more of the candidate synonyms and proceeds to step 440 without performing steps 420 and 430.

The system provides the expanded query to a search engine (step 440). For example, the system can submit the expanded query to the search engine 130 of FIG. 1. The search engine performs the search, sending search results for the expanded query to the system. The system receives the search results for the expanded query (step 450).

In some implementations, the system provides the received query of step 410 to the search engine without expanding the query. Instead, the system performs document-level mapping as described above with respect to FIG. 2C. For example, the search engine can identify as a possible search result for the query a web resource that includes at least one of the candidate synonyms of the first transliterated term but does not include any term (e.g., the first transliterated term) in the query. Alternatively, the search engine can identify as a possible search result for the query a web resource that does not include any term (e.g., the first transliterated term) in the query but that does include at least one of the terms in a source language that is mapped from the first transliterated term and from at least one of the candidate synonyms. When document-level mapping is implemented, the system can modify (e.g., reduce) a score for use in ranking that is associated with the web resource identified as a possible search result.

Figure 5:
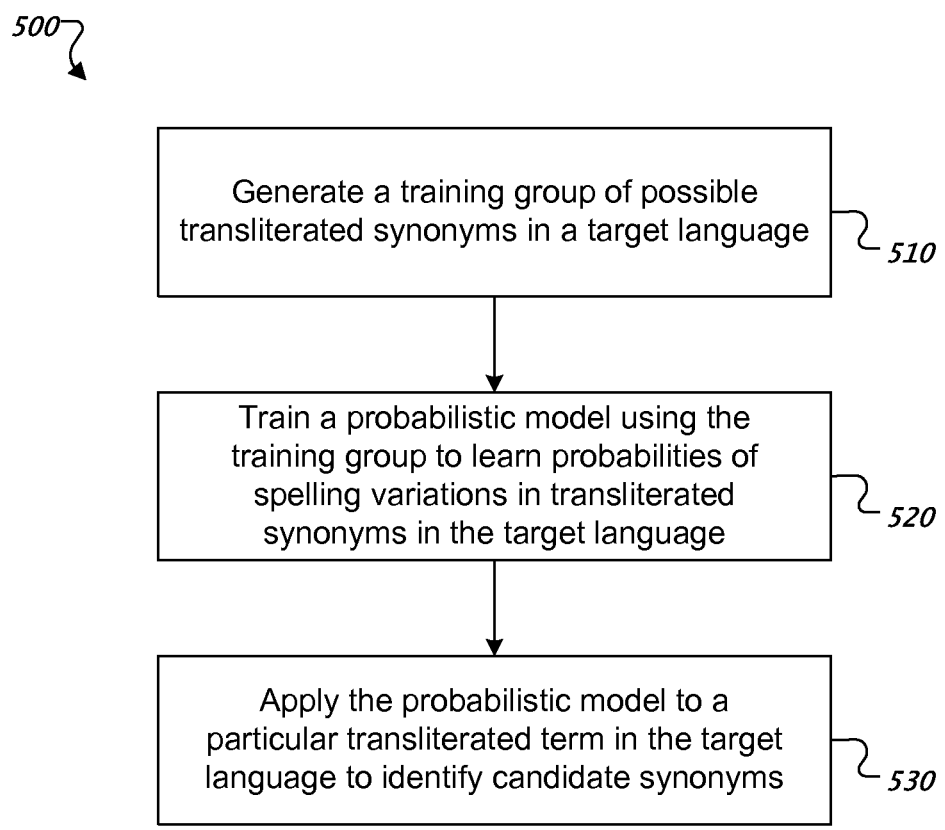
FIG. 5 is a flow chart of an example process for identifying candidate synonyms for a transliterated term.

FIG. 5 is a flow chart of an example process 500 for identifying candidate synonyms for a transliterated term. For convenience, the example process 500 will be described with reference to a system that performs the process 500. In general, the process 500 directly learns possible variations in spelling for transliterated terms in a target language. Since transliterated synonyms are generally phonetically similar, the variations between the transliterated synonyms are language specific.

The system generates a training group of possible transliterated synonyms in a target language (step 510). The system trains a probabilistic model using the training group to learn probabilities of spelling variations in transliterated synonyms in the target language (step 520). The system applies the probabilistic model to a particular transliterated term in the target language to identify one or more candidate synonyms of the particular transliterated term (step 530). The system can use the candidate synonyms for query expansion as described above.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, a device with spoken language input, to name just a few. A smart phone is an example of a device with spoken language input, which can accept voice input (e.g., a user query spoken into a microphone on the device).

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   identifying, using one or more computers, a plurality of transliterated terms in a target language, where identifying the plurality of transliterated terms in the target language comprises:
     identifying terms containing only characters of the target language,
     computing a statistic for each identified term of the terms containing only characters of the target language, where the statistic for each said identified term is based on a ratio of a probability of occurrence of the identified term in resources associated with one or more locales where the source language is spoken to a probability of occurrence of the identified term in resources associated with any locale,
     comparing the statistic for each said identified term to a specified threshold, and
     including a particular said identified term in the plurality of transliterated terms in the target language if the statistic for the identified term satisfies the specified threshold;
   for each transliterated term of the plurality of transliterated terms in the target language, mapping the transliterated term to one or more terms in a source language; and
   for a first transliterated term of the plurality of transliterated terms in the target language, identifying one or more second transliterated terms of the plurality of transliterated terms in the target language as candidate synonyms of the first transliterated term, where each of the one or more second transliterated terms is mapped to at least one term in the source language that is also mapped from the first transliterated term.

2. The method of claim 1, where the ratio for the statistic for each said identified term is a probability of occurrence of the identified term in web resources of a top-level domain associated with one or more locales where the source language is spoken to a probability of occurrence of the identified term in web resources of a top-level domain associated with any locale.

3. The method of claim 1, where the resources associated with one or more locales where the source language is spoken are determined by a top-level domain of the resources.

4. The method of claim 1, where mapping the transliterated term to one or more terms in the source language further comprises:
   transliterating the transliterated term in the target language to the one or more terms in the source language.

5. The method of claim 4, where each of the one or more second transliterated terms identified as candidate synonyms of the first transliterated term has a confidence value with respect to the first transliterated term that is above a specified threshold.

6. The method of claim 4, where the confidence value of a second transliterated term is a function of a number of terms in the source language that are mapped from both the first transliterated term and the second transliterated term.

7. The method of claim 4, where transliterating the transliterated term in the target language to a term in the source language further comprises:
   generating a transliteration score for the transliteration of the transliterated term in the target language to the term in the source language.

8. The method of claim 7, where the confidence value of a second transliterated term is a function of one or more of a probability of occurrence of the second transliterated term in web resources, the transliteration score for the transliteration of the second transliterated term to a term in the source language that is also mapped from the first transliterated term, and the transliteration score for the transliteration of the first transliterated term to the term in the source language.

9. The method of claim 1, further comprising:
   for the first transliterated term of the plurality of transliterated terms in the target language, identifying one or more terms in the source language that are mapped from the first transliterated term and from at least one of the one or more second transliterated terms as candidate synonyms of the first transliterated term.

10. The method of claim 1, further comprising:
    receiving a query including the first transliterated term;
    expanding the query with one or more of the candidate synonyms of the first transliterated term;
    providing the expanded query to a search engine; and
    receiving search results for the expanded query.

11. The method of claim 1, further comprising:
receiving a query including the first transliterated term; and
providing one or more expanded queries for selection by a user, each expanded query including the query and one or more of the candidate synonyms of the first transliterated term.

12. The method of claim 1, further comprising:
receiving a query including the first transliterated term;
providing the query to a search engine, where the search engine identifies as a possible search result for the query a web resource that includes at least one of the candidate synonyms of the first transliterated term but does not include any term in the query; and
modifying a score associated with the web resource, the score for use in ranking possible search results for the query.

13. The method of claim 1, further comprising:
receiving a query including the first transliterated term;
providing the query to a search engine, where the search engine identifies as a possible search result for the query a web resource that includes at least one of the terms in the source language that is mapped from the first transliterated term and from at least one of the one or more second transliterated terms but does not include any term in the query; and
modifying an information retrieval score associated with the web resource, the information retrieval score for use in ranking possible search results for the query.

14. A system comprising:
one or more computers configured to perform operations including:
   identifying a plurality of transliterated terms in a target language, where identifying the plurality of transliterated terms in the target language comprises:
      identifying terms containing only characters of the target language,
      computing a statistic for each identified term of the terms containing only characters of the target language, where the statistic for each said identified term is based on a ratio of a probability of occurrence of the identified term in resources associated with one or more locales where the source language is spoken to a probability of occurrence of the identified term in resources associated with any locale,
      comparing the statistic for each identified term to a specified threshold, and
      including a particular identified term in the plurality of transliterated terms in the target language if the statistic for the particular identified term satisfies the specified threshold;
   for each transliterated term of the plurality of transliterated terms in the target language, mapping the transliterated term to one or more terms in a source language; and
   for a first transliterated term of the plurality of transliterated terms in the target language, identifying one or more second transliterated terms of the plurality of transliterated terms in the target language as candidate synonyms of the first transliterated term, where each of the one or more second transliterated terms is mapped to at least one term in the source language that is also mapped from the first transliterated term.

15. A computer-implemented method comprising:
identifying, using one or more computers, a plurality of transliterated terms in a target language, where identifying the plurality of transliterated terms in the target language comprises:
   identifying terms containing only characters of the target language,
   computing a statistic for each identified term of the terms containing only characters of the target language, where the statistic for each said identified term is based on a ratio of a probability of occurrence of the identified term in resources associated with one or more locales where the source language is spoken to a probability of occurrence of the identified term in resources associated with any locale,
   comparing the statistic for each identified term to a specified threshold, and
   including a particular identified term in the plurality of transliterated terms in the target language if the statistic for the particular identified term satisfies the specified threshold;
for a first transliterated term of the plurality of transliterated terms in the target language, identifying one or more second transliterated terms of the plurality of transliterated terms in the target language as candidate synonyms of the first transliterated term; and
using the candidate synonyms of the first transliterated term to expand queries including the first transliterated term.

16. A system comprising:
one or more computers configured to perform operations including:
   identifying, using one or more computers, a plurality of transliterated terms in a target language, where identifying the plurality of transliterated terms in the target language comprises:
      identifying terms containing only characters of the target language,
      computing a statistic for each identified term of the terms containing only characters of the target language, where the statistic for each said identified term is based on a ratio of a probability of occurrence of the identified term in resources associated with one or more locales where the source language is spoken to a probability of occurrence of the identified term in resources associated with any locale,
      comparing the statistic for each identified term to a specified threshold, and
      including a particular identified term in the plurality of transliterated terms in the target language if the statistic for the particular identified term satisfies the specified threshold;
   for a first transliterated term of the plurality of transliterated terms in the target language, identifying one or more second transliterated terms of the plurality of transliterated terms in the target language as candidate synonyms of the first transliterated term; and
   using the candidate synonyms of the first transliterated term to expand queries including the first transliterated term.

17. A non-transitory computer readable storage medium storing computer instructions executable by a processor to perform a method comprising:
identifying, using one or more computers, a plurality of transliterated terms in a target language, where identifying the plurality of transliterated terms in the target language comprises:
   identifying terms containing only characters of the target language,
   computing a statistic for each identified term of the terms containing only characters of the target language, where the statistic for each said identified term is based on a ratio of a probability of occurrence of the identified term in resources associated with one or more locales where the source language is spoken to a probability of occurrence of the identified term in resources associated with any locale, comparing the statistic for each identified term to a specified threshold, and including a particular identified term in the plurality of transliterated terms in the target language if the statistic for the particular identified term satisfies the specified threshold;

for each transliterated term of the plurality of transliterated terms in the target language, mapping the transliterated term to one or more terms in a source language; and for a first transliterated term of the plurality of transliterated terms in the target language, identifying one or more second transliterated terms of the plurality of transliterated terms in the target language as candidate synonyms of the first transliterated term, where each of the one or more second transliterated terms is mapped to at least one term in the source language that is also mapped from the first transliterated term.

* * * * *